Feb. 6, 1923. 1,444,519.
C. L. NORTON.
METHOD OF MOLDING BRICK SHAPES.
FILED MAY 24, 1921.
2 SHEETS—SHEET 1.
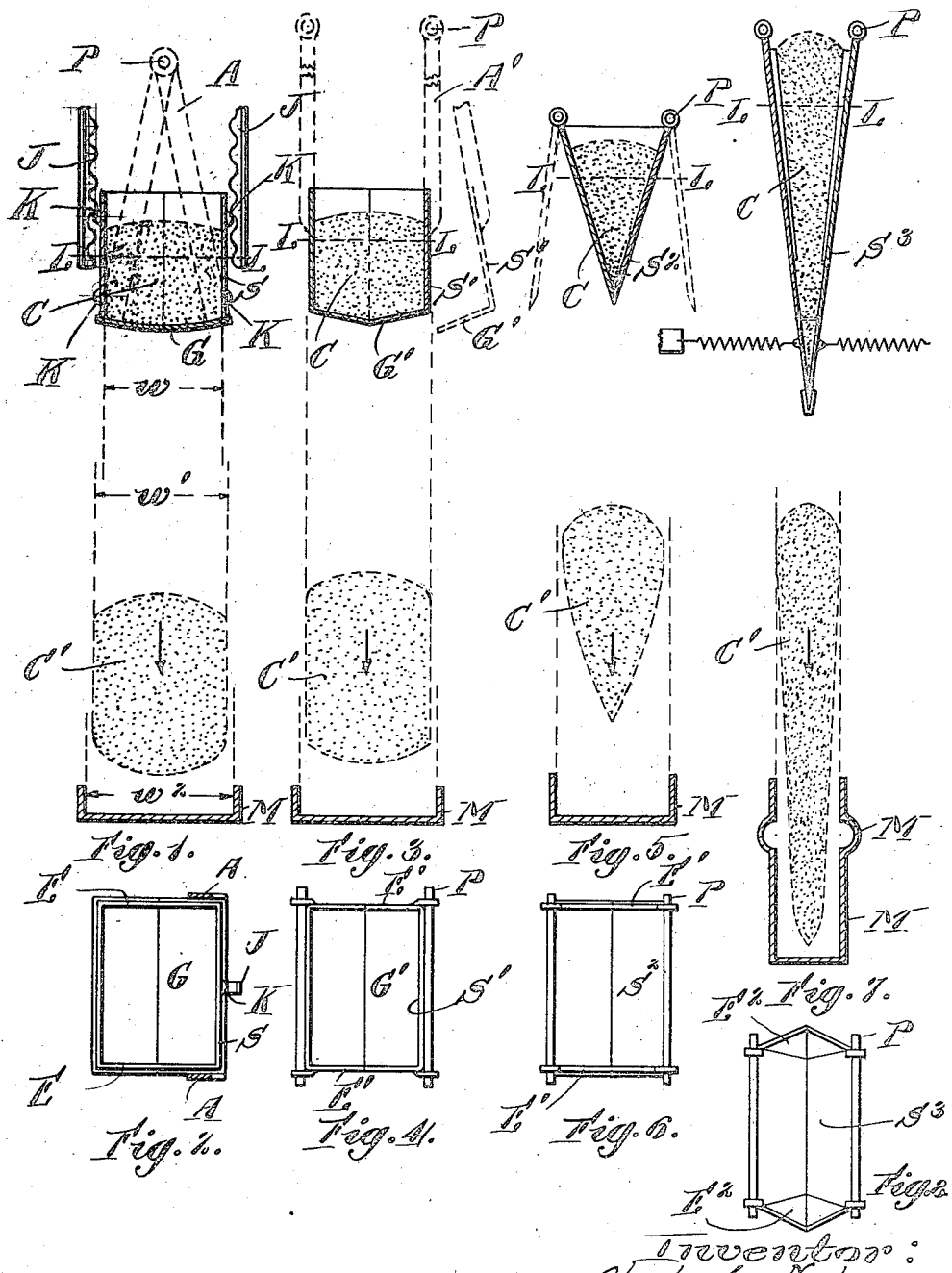
Inventor:
Charles L. Norton
by Roberts, Roberts & Cushman
attys.

Feb. 6, 1923.  
C. L. NORTON.  
METHOD OF MOLDING BRICK SHAPES.  
FILED MAY 24, 1921.  
1,444,519.  
2 SHEETS—SHEET 2.
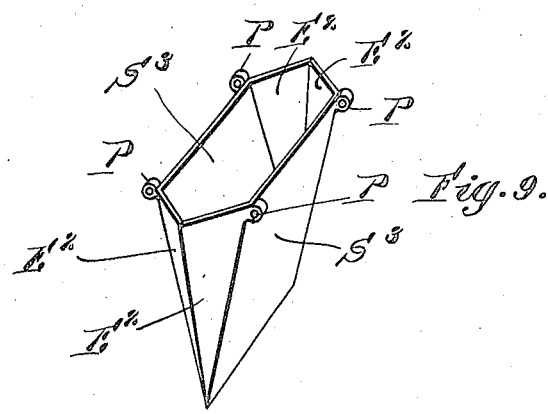
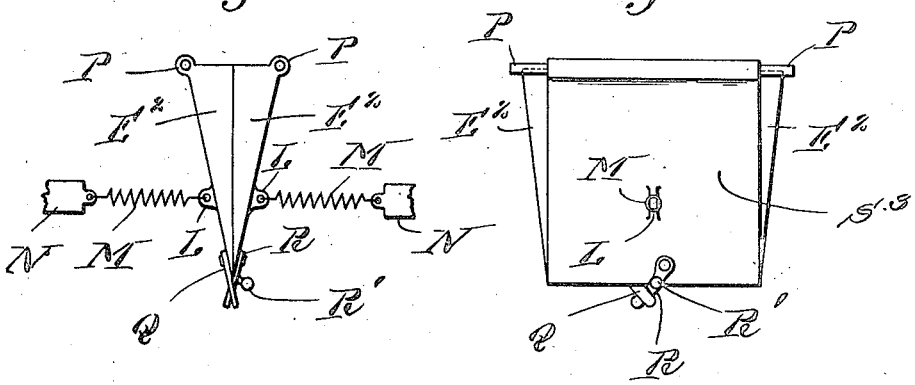
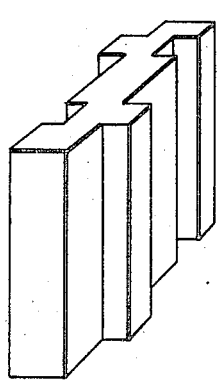
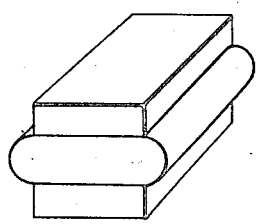
Inventor:  
Charles L. Norton  
by Roberts Roberts Cushman  
attys.

Patented Feb. 6, 1923.

1,444,519

UNITED STATES PATENT OFFICE.

CHARLES L. NORTON, OF BOSTON, MASSACHUSETTS, ASSIGNOR TO REFRACTORIES MACHINERY MANUFACTURING COMPANY, OF PITTSBURGH, PENNSYLVANIA, A CORPORATION OF PENNSYLVANIA.

METHOD OF MOLDING BRICK SHAPES.

Application filed May 24, 1921. Serial No. 472,244.

*To all whom it may concern:*

Be it known that I, CHARLES LADD NORTON, a citizen of the United States of America, and resident of Boston, in the county of Suffolk and State of Massachusetts, have invented new and useful Improvements in Methods of Molding Brick Shapes, of which the following is a specification.

In Letters Patent of the United States, numbered 1,332,676 and 1,332,677, granted to me under date of March 2, 1920, there are described and claimed a method and machine for making molded bodies of granular or comminuted material, the said method and machine being particularly addressed to the problem of automatically molding accurately formed and substantially homogeneous bodies, such as brick-shapes, composed of hard, irregularly shaped, non-plastic granules, such as the crushed ganister employed in the manufacture of refractory silica-brick.

While, as pointed out in the said patents, crushed and granular ganister furnishes a conspicuous example of the class of materials which respond to the described method but are ill adapted to other methods of molding shapes such as bricks; similar characteristics, different doubtless in degree from, but like in kind to, those which are possessed by crushed ganister, render the said method, and the improvements thereon herein described, advantageously applicable to a variety of materials. For instance, in the manufacture of clay fire-brick, the material often employed is a hard, stone-like clay, which like ganister rock has to be prepared by granulation. The granules of such clay, while not so hard as ganister granules, are nevertheless far from plastic in their constitution, and resist molding pressure to a degree so pronounced that the edges and corners of clay fire brick shapes are notoriously imperfect, and the shapes themselves defective as regards homogeneity and uniform density. And, though the moistening of such granulated hard clay, or the mixture therewith of a pasty, less refractory clay, in proportions sufficiently small to avoid undue deterioration of the heat-resisting property of the brick, produces a coating of plastic and lubricant material on the hard granules, the granules themselves manifest their non-plastic and resistant character by the aforesaid imperfections in product, when, as has heretofore been the practice, this granular clay material has been molded by extrusion through dies. My method has proved effective to mold not only silica brick, but also fire-clay brick, the material in both cases possessing similar physical characteristics.

Before making application for the aforesaid patents, I designed and caused to be built and operated, a machine (from which the illustrative drawings of the patents were made) in which the brick-molds were adapted to form the standard nine-inch silica brick forms, in groups of six forms at a single charge. Since then, other machines have been built from the pattern furnished by the first one, which have successfully demonstrated on a commercial scale the manufacture of brick by the method described and claimed in the said patents, these machines being also designed and proportioned to make the standard nine inch silica brick.

As set forth in the said patents, the physical condition characteristic of the method by which these bricks have been made, is the projection as by dropping, into a mold, of a dense swarm of individually non-plastic granules, each slightly separated from its fellows, so that each has available to it, for mobility in any direction a clear, though restricted, space. At the instant before the swarm of granules is consolidated by the accumulated impacts of the individual granules upon the surface of the mold, and against each other, the swarm presents as it were a vastly enlarged model of a drop of liquid, each granule representing a mobile molecule: and the consolidation or compacting of the swarm into the molded shape is, likewise, a model of or analogy to, the solidification or freezing, of a drop of liquid. In this sense, the swarm of individually solid granules is momentarily fluid, the granules retaining mobility and continuing motion with relation to one another and thus penetrating into all the edge and corner portions of the mold space.

It should be borne in mind that the interval between arrival in the mold of the lowermost granules in a falling charge, and the completion of the molding of the charge, is a small fraction of a second; and that during this interval the transition of each granule from its original straight path of movement through a series of rebounds and oscillating movements, progressively decreasing in length, to its final position of rest, takes place.

In order to produce effectively the conditions requisite to completely fill the mold, the granules composing each charge should be allowed to fall freely and without retardation, disturbance, or deflection, so that each granule shall descend straight to the place in the mold where its fall is arrested and its downward motion converted into a series of vibratory rebounds by impact against the surface which first arrests it, and then against other granules. For these reasons it is prescribed in the said patents that the chute or tube through which the charge falls from the hopper where it was accumulated to the mold which is to receive it, shall be, particularly at its lower end, larger in horizontal cross-section than the interior of the mold; this to avoid retardation or deflection of granules situated at the outside of the descending swarm, by contact with the sides of the chute during descent.

While machines designed and made in substantial accordance with the specifications and drawings of the said patents, or—which amounts to the same thing—duplicates of the machine from which the said drawings were prepared, have proved effective to perform the process and to produce the above described physical condition of the charge of granules, in the manufacture of the relatively simple standard nine inch silica brick, the molds for which are only as deep as the least lineal dimension of the brick—about two and one-quarter inches; it has been discovered, first: that the regularity and continuity of production of such standard brick is improved, and, second: the formation of large and irregular special silica brick shapes brought within the scope of my patented method, by improvements in method and mechanism which form the subject of this specification and its companion filed contemporaneously, the object of which is to attain the closest possible approximation to the ideal condition of a dense swarm of non-plastic granules, each surrounded by a clear though limited free space in air, and each falling freely and without diversion from its gravitative path, and with no retardation except that produced by air-resistance, until it reaches that point or region in the mold where its fall is arrested by impact, either against the bottom of the mold or against the already compacted body formed by granules which arrived earlier and are in process of finding their respective final lodgments in the accumulating mass of compacted material.

Moreover, in developing these improvements with perfected manipulation of granular and non-plastic materials as the immediate objective, I have discovered that the improvements, particularly in their preferred embodiments and exemplifications, are also adapted to the production of molded shapes composed of plastic or semi-fluid material, which while so well suited to manipulation by extrusion methods that such operations will doubtless always be resorted to when shapes of uniform cross section are to be manufactured, are nevertheless occasionally molded into shapes which are incapable of being extruded. In the latter case, molded shapes of all degrees of assymmetry and irregularity may be manufactured by the employment of the herein described improved methods and apparatus for molding by projection and impact, as by dropping a charge of material into a mold.

Thus, the present improvements are applicable to the manufacture of simple shapes, of granular and non-plastic material, and tend toward greater regularity of operation and superior quality of product, as compared with the method and apparatus described in my said patents; they are applicable also to the manufacture of more complex, difficult and larger brick shapes than were practically within the operative scope of my method and apparatus described in the said patents; though it is to be borne in mind that the fundamental principle explained in those patents persists in these improvements so long as the material operated on is of the non-plastic granular character.

But, in certain aspects herein to be alluded to, the present improvements are also adapted to the formation of complex shapes, out of plastic material, such as soft clay, and, of course, are also adapted to the formation of simple shapes of plastic material, though it is believed that the extrusion method will be regarded as more practical because more economical of time and power, for the production of simple shapes, of uniform cross section.

In the mechanism, these improvements are embodied in and expressed by the design and construction of the hopper in which the mold charge is accumulated in preparation for dropping to the mold, in the mode of operation of the hopper in relation to the accumulated charge, and in the relationship of the hopper to the mold.

In its aspect as a method, these improvements are concerned with the manner in which an accumulated charge is shaped, as in a hopper, with reference to the shape of the mold which is to receive the charge, with the manner in which the accumulated charge is released in order to fall to the mold, and with the manner in which the charge enters and fills the mold.

In the drawings hereto annexed, which illustrate these improvements,

Figure 1 represents a hopper and mold, the hopper provided with means for jarring its vertical sides, but otherwise constructed as shown in my patents above referred to;

Figure 2, a top plan view of the hopper of Fig. 1;

Figure 3, a mold, and hopper in which a side and half the bottom swing as one piece;

Figure 4, a top plan view of the hopper of Fig. 5;

Figure 5, a mold, and hopper formed by the junction between stationary end plates of two downwardly inclined swinging gates;

Figure 6, a top plan view of the hopper of Fig. 7;

Figure 7, a mold, and hopper formed by two inclined swinging plates which comprise both ends and sides of the hopper;

Figure 8, a top plan view of the hopper of Fig. 9;

Figure 9, a perspective view of the hopper of Fig. 7.

Figure 9$^a$, an end view of the hopper shown in Fig. 9 with details added;

Figure 9$^b$, a side view of the same;

Figures 10 and 11, perspective views of special brick shapes.

The drawings are, with the exception of Figs. 9, 9$^a$, 9$^b$, 10 and 11, diagrammatic; the mechanism for opening and closing the hopper may be of any specific character, such as, for instance, that shown in Figs. 4 and 12 of Patent No. 1,332,676. Hopper-opening devices, adapted to quick action, are shown in Figs. 9$^a$ and 9$^b$, and will be described hereinbelow.

The hopper shown in Patent 1,332,676 consisted of stationary vertically disposed ends and sides, and a pair of swinging bottom gates, which, meeting at a median line formed the bottom of the hopper when closed together. When an accumulated charge of granular brick material in such a hopper is released, even though the separation of the bottom gates be abrupt, so that the granular material in the middle, first deprived of vertical support, is not allowed time enough to fall appreciably in advance of the material at the two sides of the bottom of the accumulated charge, the material which was laterally supported by the sides and ends of the hopper, which adheres to the hopper to some extent, is appreciably delayed in its initial downward movement, and communicates this delay, by retardation, to material which lay near though not in contact with the sides and ends of the hopper. There is produced, therefore, a shell of delayed granules around and above the main swarm as the material falls to the mold.

The several figures of drawing, hereto annexed, from Fig. 1 to Fig. 9 inclusive, illustrate various modes and mechanisms by which the accumulated charge of granular material in a hopper may be released, i. e., deprived of support both vertical and lateral, practically instantaneously, so that the charge starts to fall all at once.

In Figs. 1 and 2 the sides S (and the ends also if desired) are provided with means for jarring or vibrating the vertical charge-supporting members of the hopper, these being, as illustrated, knobs or projections K, K, and a shallow-toothed or corrugated rack J, which, at and during the brief time required to open the bottom gates G (hung on arms A and pivoted at P) are moved over the knobs K, jarring them and the sides S of the hopper, so that the vibration of the sides S loosens the granular material from adhesive contact with them at the instant the vertical support of the gates G is withdrawn. Thus both lateral and vertical support are withdrawn from the charge in the hopper at the same time.

In Figs. 3 and 4, the side S' and gate G' are secured together, and swing on the pivot P, to which they are secured by the arms A. The separation of the sides and gates laterally, between the ends E', E', removes both lateral and vertical support from the charge simultaneously.

In Figs. 5 and 6, the sides S$^2$ of the hopper are flat plates which, pivoted at P, converge together, forming a wedge shaped hopper-space between the ends E', which are fixed. When the sides S$^2$ are abruptly swung outward, to the dotted line position, both lateral and vertical support are withdrawn simultaneously from the charge.

In the instances illustrated in Figs. 1 to 6 inclusive, the ends E or E' of the hopper are stationary and vertical, so that, at the ends there will be produced the same kind of retardation of granules as was observed with the hopper described in Patent No. 1,332,676, unless the ends E or E' be provided with means for jarring or vibrating them, such as the knobs K and rack J, shown in Fig. 1. When, however, the hopper charge, and the mold likewise, is narrow from end to end, the relatively small surface of the end pieces of the hopper will produce a correspondingly small retardation of marginal granules.

But, by preference and especially when large brick shapes of special contour, or relatively great depth, are to be made, all lateral and vertical support should be simultaneously removed from the accumulated charge in the hopper. This may be accomplished by mounting the end pieces so that they, like the sides, move outward and away from the accumulated charge. For instance, in Figs. 7, 8 and 9, the hopper is shown as composed of two similar pieces, each of which comprises a side plate S³ and laterally inclined end pieces E², joined to the side plate, the whole pivoted at P. When the sides and ends of a hopper thus constructed are abruptly swung apart, the entire accumulated charge is at one instant deprived of all support, and is momentarily suspended in the air, an aggregate of granules in the mass-shape conferred upon it by the hopper in which the charge was deposited.

A manner in which the sides and ends of a hopper can be abruptly opened is illustrated in Figs. 9ª and 9ᵇ, in which the hopper is of the character and design of that illustrated in Fig. 9. Each pivoted half of the hopper is provided with a lug L, to which is attached a spring M, the other end of which is anchored to a portion of the frame of the building or other stationary object, as indicated at N. When the two members of the hopper are closed together, the springs M are under tension. This tension is resisted and the hopper kept closed, by means of the fixed tongue Q, fastened to one of the hopper members, and the pivoted latch R, pivotally mounted on the other hopper member, in such relation to the tongue Q that the latch may engage the tongue and hold the hopper members closed. When the hopper is ready to discharge its contents, the latch R is abruptly disengaged, as by a hammer-blow against the boss R′, and the springs M, M′, cause the hopper to open instantaneously. When the hopper is to be filled again, the two halves can be brought together by hand, and latched in closed relation.

In effect, and with various approximations to the ideal condition, all the devices above described accomplish this purpose, of depriving the accumulated charge substantially of all support at the same instant, and leaving the mass of granules suspended in air for an instant, in the shape conferred upon it by the hopper. When this initial condition is obtained, it follows that every granule in the charge will respond to gravitative pull at the same instant and start to fall directly downward. Were the descent in vacuo, the shape of the charge would be the same, and the close aggregation be the same on arrival at the mold as on leaving the position of the hopper.

But by reason of the discontinuity of solid material in the charge in, and voided by, the hopper, the whole charge is interstitially filled with air, which is continuous through the charge. During the few feet of descent from the hopper position to the mold, air resistance, and to some extent also diversity of bulk as between granule and granule, causes the charge to loosen and open, producing the dense swarm of air-separated granules which is the desired physical condition of the charge on its arrival at the mold.

Figures 5 and 7 of the drawings illustrate the preferred, and the most generally applicable and useful, exemplification of my improvements. The mold charge, as formed in the hopper, and as it descends and enters the mold, is wedge-shaped, and falls with the thin end of the wedge downward. In transverse section, the charge is like a lance-head. Entering the mold, a charge thus shaped strikes the bottom of the mold first, and makes initial impact of granules (if such be the constituent parts of the charge) at the central portion of the mold bottom. At this instant of first impact, the space between the thin part of the wedge-shaped charge and the sides of the mold is void of brick-material; consequently the material, scattering by impacts and seeking paths of least resistance, flies in all directions from the central portion of the mold outward; the progressively thicker parts of the wedge-shaped charge, entering the mold, supply successive increments of the material which, in the progressively decreasing lateral space available, similarly scatter outward and prevent earlier arrivals of material from returning toward the central part of the mold-space. The material is thus projected with considerable force outwardly from the entering charge, and accumulates in the mold by building laterally and inwardly from the sides. The molded charge, formed as it is by an operation which is continuous during the brief interval required to fill the mold, presents no stratifications or demarcations; but if successive layers of material, each of the same volume, were contrastingly colored in the hopper, the coloration of material when molded would present cross sections of a series of conic sections, generally similar to the sections of surfaces produced by centrifugal action on a liquid in a rotating vessel.

The adaptation of this preferred exemplification of my improvements to the formation of brick shapes of granular non-plastic material has been already described. When, however, the condition characterized by a mold charge previously shaped to a form and volume smaller in horizontal section than the mold, particularly when the charge is tapered or wedge-shaped, is obtained, these improvements find further adaptation in the field of genuinely plastic materials, such as the finely comminuted, tempered and moistened clay of which building bricks are made.

Practically, it is believed that in its application to plastic materials the relative utility of this improved method and apparatus will be confined to the production of large and complex shapes, incapable of being formed by the extrusion method, which is economically used for the manufacture of plastic brick shapes of a uniform cross section.

If the mold charge be of such plastic clay, shaped in a hopper so that the charge will fall into the mold without touching the sides thereof until its material splashes laterally by impact, especially if the charge be made tapered or wedge-shaped so as to enter the mold edge first, irregular or complex shapes can be accurately molded, and shapes not susceptible of being molded by extrusion may thus be automatically produced. Projection, as by dropping, of a mass of plastic material into a mold, the mass being equal to or greater than the mold in horizontal section, so that the open top of the mold is completely covered before the lower and lateral portions are filled, tends to imprison air in the mold, which acts as a cushion to prevent the material from penetrating to all parts of the mold. For this reason previous methods of molding plastic material by dropping it from a height into a mold have been characterized by subdividing the plastic material into small bodies, such as pellets—each in itself plastic—and showering the pellets into the mold. This method lacks the laterally directed explosive scattering of the material such as is produced by the arrest of a single wedge-shaped mass, falling into the mold in the manner herein described.

The initial and characteristic step in this improvement on my patented method of forming brick-shapes of granular non-plastic material is the substantially instantaneous withdrawal of all support, both vertical and lateral, from a mold-charge accumulated in a hopper, and formed thereby in a defined shape and volume, so that this defined shape and volume is not sensibly altered by the removal of support.

If the proportions of the mold are such that the mold charge in the hopper is narrow, and the hopper therefore has ends of relatively small superficial extent, this initial characteristic step will be effectively taken if the mold-charge be not sensibly altered in its vertical transverse section, since marginal alteration in its vertical longitudinal section will be inconsiderable because of the relatively inconsiderable area of the ends of the mold-charge. For the manufacture of brick shapes which are narrow in horizontal section, therefore, all that will be necessary at the hopper to accomplish the desired result will be to provide sides and bottom adapted to abrupt and complete withdrawal of support from the charge at all supported surfaces thereof except the ends. But, if the brick-shape to be molded is substantially as broad as it is long, provision should be made for releasing vertical and lateral support from all supported surfaces of the mold-charge in the hopper, in the manner described, so that the shape and volume of the mold-charge shall be unaltered by the act of withdrawing support.

By means such as above described, the shape and bulk of the aggregate of granules is determined, both at the beginning of its descent, and at the terminus of descent, since the extent of separation of granules in transit through a given distance is susceptible of measurement.

What the initial shape and bulk of the hopper charge shall be, in order to secure practically perfect physical conditions in the charge at the instant of arrival at the mold, is determined mainly with reference to the interior horizontal cross sectional area of the mold. Let it have been determined, for instance, that a charge of granules opens out, or swells by spacial separation of its granular components, from thickness $w$, in the hopper, to thickness $w'$ at the lower end of its descent (as indicated in Fig. 1). If the internal horizontal width of the mold be $w^2$, then the hopper will be so proportioned that the thickness $w'$ of the swarm of granules shall be slightly less than $w^2$. A similar dimensional relation should be established as between the length of the mold and the length of the hopper. To express the matter more exactly: The maximum horizontal cross section of the mold-charge in the hopper should be uniformly and marginally smaller than the minimum horizontal interior cross section of the mold by an area sufficient to allow for the expansion of the charge by separation of granules during fall to the mold, leaving preferably a slight excess or clearance, so that the maximum horizontal cross section of the expanded mold-charge shall be a little less than the minimum internal horizontal cross section of the mold. In other words, the desired condition is obtained, if the horizontal profile of the mold-charge in the hopper, when superposed on the horizontal profile of the interior of the mold (both as viewed from above) were to show the latter profile exceeding the former by a peripheral margin.

When the horizontal section of the hopper is thus determined, its depth will be made sufficient to hold a mold-charge, with a surplus of material for ensuring a complete mold-charge, as set forth in my said patents.

In the drawings, the hopper-charge is designated by the letter C, and the elongated and expanded swarm of granules, into which the mold-charge is transformed by the forces acting on it during descent, by the letter C'.

The line L, L, in Figs. 1, 3, 5 and 7, indicates diagrammatically the surplus material in the hopper which lies above the line, that below the line representing the mold-charge, or the amount which will fill the mold level with the top thereof.

The horizontal cross section of the upper surplus material may be larger than the interior horizontal section of the mold. The sectional or dimensional relationships above described, relate only to portions of the hopper charge which are destined to remain in the mold after deposition, and not to portions of the hopper charge which are therein accumulated as surplus to ensure compact filling of the top part of the mold. There is therefore a practical distinction between the hopper-charge and the mold-charge. In order to ensure a full charge in the mold, the hopper charge contains more material than the filled mold, surplus deposited above the mold being removed and the top of the mold-charge leveled off, as described in my said patents. The mold-charge, when in the hopper constitutes only a part of the hopper-charge. That portion of the hopper-charge which, as the mold-charge, is destined to enter and remain in the mold is the portion to be manipulated in the manner herein described. Practically, the whole hopper charge will be deprived of support both vertically and laterally to secure the results arrived at; so far as concerns the essentials, however, the condition of granules in the upper or surplus portion of the hopper-charge both at the beginning of and during descent is of secondary, or no special, consequence, so long as a surplus of material is provided to furnish the final accumulation of compacted material over the top of the mold. By observing the rules of proportion, construction, and operation above set forth, a mold-charge of individually isolated and mobile granules, in descending into a mold, falls vertically in its entirety; each granule arrives at its region of arrest and impact in the gravitative straight line of movement, and thus no granules distract or deflect others during descent by reason of their own retardation or deflection. Reaction of granules upon each other is deferred until the movement when such reaction of repeated impacts is desired, in order to propel granules laterally to all portions of the mold.

Recesses, such as M' (Fig. 7) will be filled compactly by the improved method here described, and relatively large and deep shapes, such as illustrated in Figs. 10 and 11, can be made automatically by the charge-dropping method. Heretofore, such large and relatively complex shapes have been producible only by a slow hand method of gradual and progressive filling and tamping; and the shapes produced have been variable in respect to density and quality. Such shapes, produced instantaneously by my improved method, are not only manufactured with far greater rapidity than by hand, but with accuracy and uniformity. In drying and firing, these automatically molded shapes suffer a loss by defects so small as to be inconsiderable.

What I claim and desire to secure by Letters Patent is:

1. In the designated method of molding brick-shapes of granular non-plastic material, accumulating a mold charge at a height above a mold, and simultaneously depriving said charge substantially in its entirety of both vertical and lateral support.

2. In the designated method of molding brick-shapes of granular non-plastic material, forming a mold charge of defined shape and volume at a height above a mold, and depriving said formed charge of vertical and lateral support without derangement of its defined shape.

3. In the designated method of molding brick-shapes of granular non-plastic material, forming a mold charge of a defined vertical cross-section at a height above a mold, and depriving said formed charge of vertical and lateral support without derangement of the definition of said vertical cross-section.

4. In the designated method of molding brick-shapes of granular non-plastic material, accumulating a mold charge at a height above a mold, simultaneously depriving said charge substantially in its entirety, of both vertical and lateral support, and allowing the constituent granules of said charge to fall freely each to its place of arrest within the mold.

5. In the designated method of molding brick-shapes of granular non-plastic material, forming a mold charge of defined shape and volume at a height above a mold, depriving said formed charge of vertical and lateral support without derangement of its defined shape, and allowing the constituent granules of said charge to fall freely each to its place of arrest within the mold.

6. In the designated method of molding brick-shapes of granular non-plastic material, forming a mold charge of a defined vertical cross-section at a height above a mold, depriving said formed charge of vertical and lateral support without derangement of the definition of said vertical cross-section, and allowing the constituent granules of said charge to fall freely each to its place of arrest within the mold.

7. In the designated method of molding brick-shapes of granular non-plastic material, forming a mold charge at a height above a mold, of such defined shape that the horizontal profile of said mold charge is similar to, but smaller than the horizontal profile of the brick-shape to be molded, and simultaneously depriving said mold charge substantially in its entirety of both vertical and lateral support.

8. In the designated method of molding brick-shapes of granular non-plastic material, forming a mold-charge of defined shape and volume at a height above a mold, such that the horizontal profile of said mold charge is similar to but smaller than the horizontal profile of the brick-shape to be molded, and depriving said mold charge of vertical and lateral support without derangement of its defined shape.

9. In the designated method of molding brick-shapes of granular non-plastic material, forming a mold charge of a defined vertical cross-section and of horizontal profile similar to but smaller than the horizontal profile of the brick-shape to be molded, at a height above a mold, and depriving said formed charge of vertical and lateral support without derangement of the definition of said vertical cross-section.

10. The designated method of forming brick-shapes by dropping a charge of brick-material into a mold, characterized by building the molded shape progressively from the sides of the mold inwardly.

11. The designated method of forming brick-shapes, comprising forming a mold-charge of brick material of a defined vertical cross-section and of horizontal profile similar to but smaller than the horizontal profile of the brick-shape to be molded, at a height above a mold, and dropping said formed charge into a mold.

12. The designated method of forming brick-shapes, comprising forming a wedge-shaped mold charge of horizontal profile similar to the horizontal profile of the brick-shape to be molded, at a height above a mold and dropping said formed charge point foremost into a mold.

13. In the designated method of molding brick-shapes of granular non-plastic material, forming a wedge-shaped mold charge at a height above a mold, of horizontal profile similar to the horizontal profile of the brick-shape to be molded, and dropping said formed charge point foremost into a mold.

14. The method of making silica brick, or the like, which comprises the compression of a quantity of plastic material into a compact substantially wedge shaped mass, projecting, as by dropping, the material to a mold, such quantity of the material being slightly in excess of the capacity of the mold, and in such manner that the point of the wedge shaped mass of the material will strike the center of the mold and spread to all sides and corners thereof.

15. The designated method of forming brick-shapes, comprising forming a downwardly tapered-shaped mold charge of horizontal profile similar to the horizontal profile of the brick-shape to be molded, and dropping said formed charge point foremost into a mold.

Signed by me at Boston, Massachusetts, this twenty-third day of May, 1921.

CHARLES L. NORTON.